Nov. 2, 1971    G. E. BURNHAM, SR    3,616,599
METHOD AND APPARATUS FOR THE DEGASIFICATION OF DRILLING MUDS
Filed Feb. 19, 1970    2 Sheets-Sheet 2
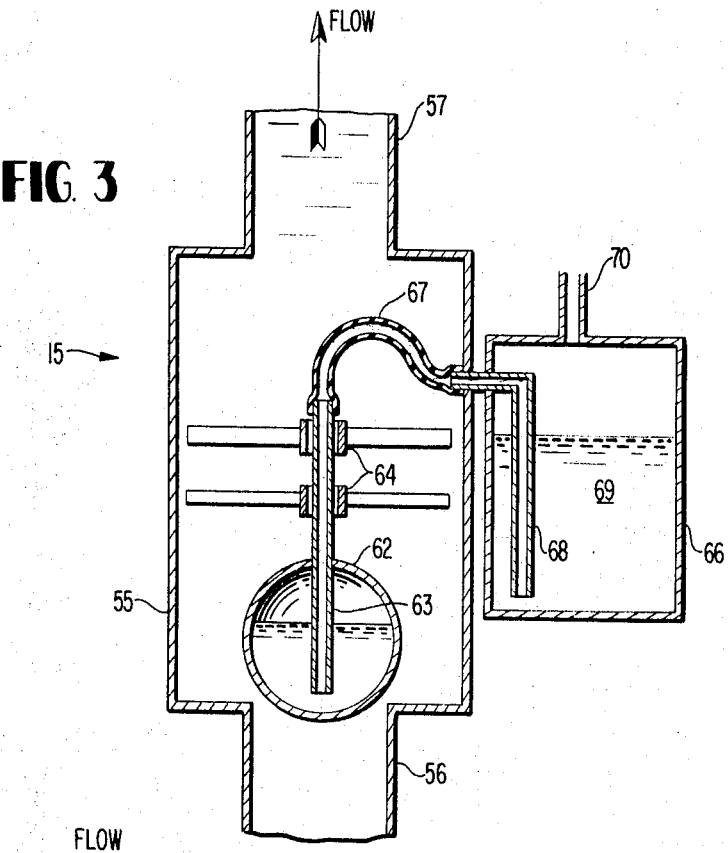
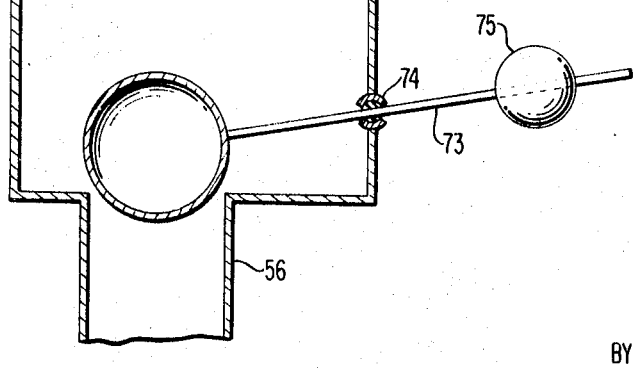
INVENTOR
GERALD E. BURNHAM, Sr.
BY
ATTORNEYS

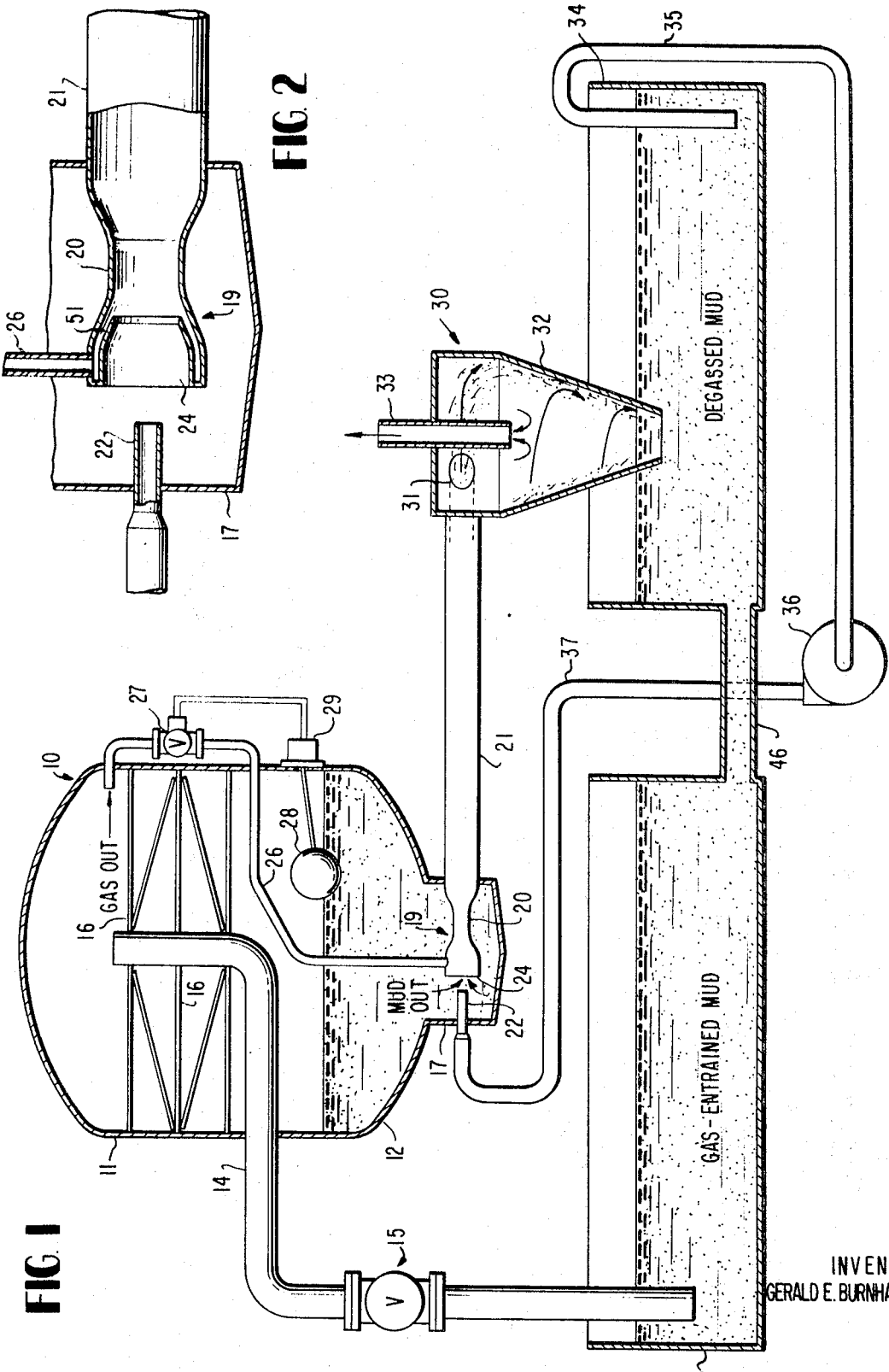

United States Patent Office 3,616,599
Patented Nov. 2, 1971

3,616,599
METHOD AND APPARATUS FOR THE DEGASIFICATION OF DRILLING MUDS
Gerald E. Burnham, Sr., Lafayette, La., assignor to Thermotics, Inc., Houston, Tex.
Filed Feb. 19, 1970, Ser. No. 12,543
Int. Cl. B01d 19/00
U.S. Cl. 55—41
20 Claims

ABSTRACT OF THE DISCLOSURE

Drilling mud degasification apparatus having baffle plates in a vacuum tank over which thin films of mud are degassed as they flow downward to a receiving area of the tank. Venturi-type dual ejector apparatus is located in a sump in the tank to remove degassed mud and to draw a vacuum on the upper portion of the tank.

BACKGROUND OF THE INVENTION

Field of the invention

This invention relates to a system for the degasification of drilling mud used in a drilling mud recirculation system at the well head. It is particularly directed to a vacuum tank for use in this system employing a new and improved apparatus for evacuating the degassed mud from the vacuum tank, and for drawing a vacuum on the tank in order to facilitate the flow of drilling mud and to remove the gas from the mud.

The state of the prior art

It is customary to circulate a drilling mud through the well bore and around the drill bit during the drilling operation of wells for gas and oil. Drilling mud is ordinarily an aqueous suspension of solid matter although plain oils may be utilized. Drilling mud lubricates and cools the drill bit and serves as a carrier to withdraw drill cuttings and sand from the well for disposal. Furthermore, drilling mud provides a pressure seal in the well bore to prevent the escape of gases from the well. The pressure exerted by the column of drilling mud is greater than the pressure which may be released through striking gas pockets as the well is drilled, and thereby the column of drilling mud counteracts gas pressure, preventing blowouts. It is necessary to maintain the drilling mud at a predetermined density based on the pressures it is anticipated will be encountered during the drill operation.

The drilling mud is continually recirculated to and from the well bore in the course of the drilling operation. As it recirculates and as it continuously comes into contact with gas under the high temperatures and pressures present in the well bore, gases tend to become entrapped within the drilling mud. As this gas becomes entrapped, the density of the drilling mud decreases and therefore the ability of the drilling mud to counteract the gas pressures within the well bore diminishes. The increased quantity of gas entrapped within the drilling mud also tends to increase its viscosity, thereby increasing its resistance to flow and imposing a greater load on the pumping apparatus.

The prior art shows examples of systems for the degasification of drilling mud, many of which utilize a vacuum tank and some sort of baffle arrangement which exposes the drilling mud to vacuum environment, thus causing the entrapped gas to be removed. This is only part of the task however, for serious problems are encountered in the handling of drilling muds, particularly in evacuating the drilling mud from the vacuum tank to return it as degassed mud to the well head. Precise control of the rates at which drilling mud enters the vacuum tank, degassed mud leaves the vacuum tank, and gases are evacuated from the tank is necessary in order to produce an acceptable product at the necessary rate.

The systems of the prior art use a separate vacuum pump and often expose this apparatus to the possibility of ingestion of drilling muds, a situation which normally proves fatal to the pumping mechanism and, at the very least, forces the entire system to be shut down for cleaning. Prior art devices have also exhibited problems in matching the vacuum pulled on the vacuum tank with the flow requirements of the entire system, which may be continually changing. The instant invention provides a solution to all these problems.

SUMMARY OF THE INVENTION

This invention describes a system for the degasification of drilling mud in a continuous manner as the mud is circulated to and from a well head. The system includes a vacuum tank having a series of baffles upon which gas-entrained drilling mud is deposited in order to facilitate the gas separation. The contaminated mud is pulled into the vacuum tank in response to the vacuum level therein, and is removed as degasified mud from the lower portion of the vacuum tank by a new and improved dual ejector apparatus which eliminates the need for a separate vacuum pump. This dual ejector apparatus includes a single venturi structure defining a flow passage in communication with an outlet conduit, means for utilizing a portion of the degasified drilling mud as the motivating fluid for the dual ejector, and two ejector inlets. The first ejector inlet is in communication with the lower portion of the vacuum tank and ejects degasified mud from the tank into the outlet conduit. The second ejector is positioned annularly about the first ejector inlet and is in communication with the upper portion of the vacuum tank so that it may continuously draw gases from the vacuum tank, keeping it at a predetermined vacuum level. Valve means responsive to the level of degasified mud in the vacuum tank provides a control of the amount of gases which flow to the second ejector inlet, thus controlling the rate at which gas-entrained mud is pulled into the vacuum tank and the rate at which gases are removed from said mud. This valve can also include a vent means to atmosphere so that upon certain circumstances the vacuum can be entirely depleted bringing the flow of mud into the tank virtually to a halt.

Additional control is provided by a density-sensing valve means in the contaminated mud inlet line. The density mud valve throttles the inlet line if the density of contaminated mud decreases, and opens if it increases. This insures that the proper vacuum level is maintained in the vacuum tank.

An object of this invention is to alleviate known difficulties in the art by providing a new and improved system for the degasification of drilling muds whereby a large quantity of entrapped gas may be efficiently removed from said mud and the mud recirculated to and from the well head.

Another object of this invention is to provide a new and improved apparatus for evacuating degassed mud from the vacuum tank and for drawing a vacuum on the vacuum tank.

Another object of this invention is to provide an evacuation apparatus including a dual ejector assembly comprised of a venturi structure, a first ejector nozzle associated with said structure to remove mud from a mud receiving area within the vacuum tank, and a second ejector inlet associated with said structure for creating a vacuum in the vacuum tank.

Another object of this invention is to provide an improved arrangement for controlling the rate at which gas-entrained drilling mud is drawn into and removed from a vacuum chamber and the rate at which the gas is removed from the mud.

Another object of this invention is to provide a new and improved apparatus for controlling the viscosity of drilling mud by degassing the drilling mud to a predetermined level and by mixing previously degassed drilling mud with the degassed mud in the vacuum tank.

Another object of this invention is to provide a dual ejector mechanism in a compact unit, thus reducing the piping requirements and facilitating the installation of the equipment.

Another object of this invention is to provide a mud degasification system in which the inlet flow is controlled in response to the density of the incoming mud.

Other objects and advantages of this invention will become apparent from the following description taken in connection with the accompanying drawings wherein embodiments of the invention are set forth by way of illustration and example.

DESCRIPTION OF THE DRAWINGS

FIG. 1 is a vertical schematic view of the system for degasification of drilling mud illustrating the features of the invention.

FIG. 2 is a vertical sectional view of the new and improved dual ejector system.

FIG. 3 is a vertical sectional view of the new and improved density mud valve.

FIG. 4 is a vertical sectional view of another embodiment of the density mud valve.

DETAILED DESCRIPTION OF THE INVENTION

Referring to FIG. 1, the system includes a vacuum tank indicated generally at 10 having a degasification area 11 in which the gas-laden mud is degassed and a mud receiving area 12 into which the degasified mud flows and is collected for pumping and recirculation. Gas-laden drilling mud is drawn into vacuum tank 10 by means of an inlet conduit 14 which may have a control valve means 15 installed therein, and is then deposited upon a series of baffles 16, such as those described in U.S. Pat. 3,481,113, which separate the mud into thin layers, thus exposing a large surface area to the vacuum to facilitate efficient degasification. The degasified mud then drains down to the mud receiving area 12. In the lowermost portion of vacuum tank 10 is a mud pot 17 in which the mechanism which evacuates degasified mud from the tank is advantageously located. This evacuation system is a dual ejector jet pump 19 having a venturi area 20, an outlet pipe 21, and a nozzle 22 providing motivating fluid axially through venturi 20. The consequent reduction in pressure causes degasified mud to be induced into first ejector inlet 24. Immediately adjacent the first ejector inlet is a second ejector inlet for drawing a vacuum on degasification area 11 of vacuum chamber 12, communicating with said degasification area 11 by means of a vacuum conduit 26. The flow of gases through vacuum conduit 26 can be controlled by a valve means 27 responsive to a float-sensing mechanism having a ball 28 and an actuator 29 responsive to a predetermined level of degassed mud in vacuum chamber 10. Valve means 27 can also include a position in which conduit 26 is fully or partially vented to atmosphere.

In a preferred embodiment of the invention, outlet conduit 21, containing a mixture of degasified drilling mud and gases removed from the degasification area 11 of vacuum chamber 10, communicates with a gas-venting means such as a cyclone separator indicated generally at 30 and having a tangential inlet 31, a hopper 32, and a gas vent 33 to the atmosphere.

Degasified drilling mud and the gas removed from mud in degasification area 11 can be exhausted through a common conduit 21 and then easily separated in means such as a cyclone separator because once the gas is extracted, it would take great pressures, temperatures and agitation to re-entrain the gas within the mud, and such are not present in the dual ejector and the outlet conduit. Therefore, once exposed to a mechanism such as a cyclone separator, the gas readily separates from the drilling mud as the mud spirals downward through hopper 32.

Hopper 32 of the cyclone separator discharges into a degasified mud receiving tank 34. It is from this tank 34 that the degasified mud used as motivating fluid for the dual ejector is drawn through conduit 35 by means of a pump 36, and is delivered to conduit 37 and nozzle 22. Recirculating means, not shown, pump the major portion of degasified drilling mud from tank 34 for recirculation within the well bore and then deposit it in a contaminated mud receiving tank 45 located in the same horizontal plane as tank 34, for reasons which will hereinafter be explained.

Communicating with tank 45 is conduit 14 through which the contaminated well mud is drawn into vacuum tank 10 for degasification.

Degasified mud tank 34 and contaminated mud receiving tank 45 are advantageously located in the same horizontal plane and are connected together in the lower portions by a balance pipe 46. This is done so that a predetermined head of fluid can be maintained in tank 45 regardless of variation in the rate at which contaminated mud is received from the well bore. By means of balance pipe 46, degasified mud can flow into tank 45 if the level of tank 45 drops below acceptable requirements. This degassified mud, being of higher density than the contaminated mud, will stay in the bottom of the tank and will insure that a sufficient head of contaminated mud is provided for conduit 14.

FIG. 2 shows in detail the new and improved dual ejector 19 which is a part of this invention. Most advantageously, this compact ejector is installed in mud pot 17 so that it will continuously eject the most dense portion of the degasified mud. Nozzle 22 provides a continuous stream of degasified mud as the motivating fluid for the ejector. This is pumped through venturi 20 and creates a low pressure area in the mouth of dual ejector 19, causing degasified drilling mud to be drawn in through first ejector inlet 24 and gas to be drawn through gas conduit 26 into second ejector inlet 51. The force of the motivating fluid issuing through nozzle 22 not only creates a vacuum drawing degasified mud from mud pot 17 and gases from the degasification area 11, but also pushes this mixture of gases and degassed mud through outlet conduit 21. Second ejector inlet 51, which pulls the vacuum on chamber 10, is advantageously positioned such that it is subjected to the area of highest vacuum. The energy necessary to move mud and gas is readily available in the dual ejector design advanced by this invention. The rate of gas and mud pumped through the dual ejector can be regulated to the desired quantity of each by varying the flow rate through nozzle 22 in conjunction with controlling the flow of gas through the second ejector inlet by means of valve 27.

In experiments, with a flow rate of 600 gallons per minute at 40 p.s.i. through nozzle 22, 1200 gallons per minute of mud could be ejected from the degasser while maintaining 10 inches of mercury vacuum on the degasification area 11. By increasing the motivating fluid flow through nozzle 22 to 800 gallons per minute, approximately 1600 gallons per minute of degasified mud was ejected from the tank while still maintaining 10 inches of mercury vacuum on degassification area 11. At the 1200 gallon per minute ejection rate, approximately 53 cubic feet per minute of gas was pulled through the second ejector inlet.

It is advantageous to provide another control means on inlet pipe 14 since the density of the contaminated mud can vary greatly.

If the density of contaminated mud decreases, a greater flow velocity into the tank will be established, manifesting itself in increased volume. Such a condition will ultimately be sensed by float 28, which will close vacuum control valve 27 somewhat to lower the degree of vacuum in the tank, thus slowing the incoming mud flow. This could cause the vacuum in the tank to drop below that necessary to degassify the mud to the extent desired.

Referring now to FIG. 3, density mud valve 15 includes an inlet 56, a valve body 55, and an outlet 57. Mounted in valve body 55, aligned with the flow axis, is a hollow valve ball 62 usually partially filled with liquid and affixed to a control tube 63, which can move axially in supports 64. Control tube 63 communicates with a liquid reservoir 66 by means of a flexible hose 67, which terminates in a tube 68 beneath the level of liquid 69. A vacuum can be created in reservoir 66 by means of a tube 70 communicating with a vacuum source, not shown. The density of valve ball 62 depends upon the amount of liquid in the ball, and this is predetermined before placing the system into operation, and established by placing a vacuum on reservoir 66. The source of this vacuum can be a separate pump, or line 70 can be connected to tank 10 or conduit 26, with suitable valves therebetween.

The extent of the vacuum necessary in tank 10 is determined by certain factors present in the particular operating situation in which the degasification system is employed. Chief among these factors are the composition of the drilling mud, the vertical distance which the mud must be lifted between contaminated mud receiving tank 45 and vacuum tank 10, and the rate at which the system will be operated. Density mud valve 15 must operate in such a manner as to allow the vacuum in tank 10 to stay within acceptable limits, regardless of variations in the density of the incoming mud.

In the density mud valve shown in FIG. 4, a valve ball 72 of predetermined density is supported in the axial flow path by a support lever 73 which extends outside valve body 55 through a pivotal seal 74. A control weight 75 is slidable on lever 73 to vary the effective weight of ball 72. It is within the concept of this invention, however, to substitute for manually adjustable control weight 75 a vacuum responsive means such as a hollow ball having a liquid reservoir and vacuum-sensing means like that shown as the valve ball 62 in FIG. 3.

It is also contemplated within the scope of this invention to use in the density mud valve 15 a valve ball with a fixed density having the desired relationship to the mud density for that particular installation, with no means for varying the valve ball density other than replacement of the ball itself. This would be suited to permanent installation where the mud density varies within relatively narrow limits.

It may be desirable to include in mud receiving area 12 a vortex breaker to eliminate vortical flow and the possibility of a churning action being established in the area of the first ejector inlet under some conditions. Such an element is not shown herein, but it can be like that described in U.S. Pat. 3,481,113.

In operation, degassed mud is circulated from tank 34 through the well bore and head, wherein it becomes exposed to gas which becomes entrained therein. It is then pumped out of the well bore and deposited in contaminated mud receiving chamber 45. A flow of degasified mud is established through nozzle 22 by means of a pump 36, thus rendering operative the dual ejector 19. The operation of dual ejector 19 causes mud to be pulled from pot 17 through venturi 20 and outlet conduit 21 and at the same time causes a vacuum to be drawn on degasification area 11 by means of second ejector inlet 51 communicating with tank 10 through conduit 26. The vacuum drawn on degasification area 11 will cause contaminated well mud to flow through inlet pipe 14 into tank 10 and be deposited upon baffle 16. Baffle 16 causes the mud to form thin layers from which the gas is more easily separated, again by virtue of the low pressure present in the vacuum tank. A valve 15 is provided in inlet conduit 15 in order to compensate for changes in the density of contaminated mud. The rate at which mud flows into vacuum chamber 10 is dependent upon the vacuum which is drawn on the chamber. All other factors remaining constant, and within the design limits of dual ejector 19, the more motivating fluid pumped through the dual ejector, the greater the vacuum which will be created in tank 10. This demonstrates one of the advantages of the present invention. By simply varying the rate of motivating flid to the dual ejector, the mud ejecting rate, gas ejecting rate, and rate of contaminated mud introduced into the vacuum tank will vary together simultaneously in a known ratio. This provides an inherent control which negates the need for the complicated control means which are necessary in other systems in the prior art. Further control is provided by adjusting valve 27 in response to a predetermined condition such as the leved of the mud as sensed by float 28. Holding the rate of motivating fluid constant, if the level of degasified mud exceeds that desired, valve 27 will close slightly thus decreasing the vacuum present in chamber 10 and causing the flow of mud into the chamber to be diminished. In like manner, if the level of degasified mud falls below that desired, valve 27 is opened thus increasing the vacuum and increasing the flow of mud into the chamber.

It can be readily seen that the interaction of first ejector inlet and second ejector inlet, causing the rates of mud pumped from the chamber and vacuum drawn in the chamber to vary together, plus the additional controls provided by sensing the degasified mud level within the tank and the density of the contaminated mud, provide a very simple but very precise means for controlling the flow through the entire apparatus.

The mixture of degasified mud and gases pulled from the vacuum tank flows through exhaust conduit 21 into a simple gas separating means such as a cyclone separator 30, which allows the gas which is carried along by the degasified mud to be separated from the mixture and flow outward through vent 33. The degasified mud then drops through hopper 32 into degasified mud tank 34 from which a portion of it is again extracted for use as a motivating fluid for the dual ejector, while the major portion is recirculated through the well head.

Advantageously, additional control of the system is provided by density mud valve 15 shown in FIG. 3. If the density of incoming contaminated mud decreases, at a constant vacuum the mud velocity will increase, thus pulling in a greater volume of mud. This surge would eventually be sensed by the float control 29, and the vacuum line 27 throttled, but this could cause the vacuum to be reduced below an acceptable level. Density mud valve ball 62 is charged with a liquid 69 until its weight is such that a predetermined ratio between the ball density and the mud density is established, allowing the desired flow through valve inlet 56 when the system is operating normally. Ball 62 will respond to a decrease in contaminated mud density by dropping lower in the flow stream, thus throttling the flow somewhat and effectively keeping the flow volume and the vacuum in the tank constant. If mud density increases, the density ratio has changed, and ball 62 will rise, allowing an increase in flow.

The density mud valve in FIG. 4 functions in a like manner, except for the fact that it is adjusted by means of movement of weight 75.

It is to be understood that while the invention is herein illustrated and described in preferred forms, it is not to be limited to specific forms or arrangements of parts herein described and shown. The scope of the invention is to be determined by the claims.

What is claimed is:

1. A system for degasification of drilling mud comprising:

a vacuum tank defining a degasification area in the upper portion and a mud receiving area in the lower portion, baffle means in said tank for spreading said mud to increase its surface area, means for depositing gas-laden mud on said baffle means, a dual ejector having a first ejector inlet in communication with said mud receiving area for ejecting mud from said tank and a second ejector inlet in communication with said degasification area for drawing a vacuum on said tank to effect a separation of entrapped gas from said mud, and an outlet conduit in communication with said dual ejector for receiving mud and gas drawn from said tank by said dual ejector.

2. The combination of claim 1 further comprising means for controlling the flow of gas-laden mud upstream of said depositing means in response to the density thereof.

3. The combination of claim 2 further comprising valve means controlling the flow of gases to said second ejector inlet in response to a condition in said system.

4. The combination of claim 1 wherein said dual ejector comprises:
a venturi structure defining a flow passage in communication with said first ejector inlet and said second ejector inlet, and means operatively associated with said venturi structure for projecting a flow of motivating fluid through said flow passage.

5. The combination of claim 4 further including means venting said outlet conduit to atmosphere downstream of said second ejector inlet to remove the gas from the conduit.

6. The combination of claim 5 further including
a degasified mud receiving tank connected to said outlet conduit downstream of said venting means, wherein said motivating fluid is degasified mud, and wherein said means for projecting a flow of motivating fluid includes a pump drawing degasified mud from said mud receiving tank and delivering said mud under pressure to said flow passage.

7. The combination of claim 6 wherein said vacuum tank includes an ejector pot protruding downwardly from said mud receiving area, said venturi structure being located in said ejector pot, and said first ejector inlet communicating with said ejector pot.

8. The combination of claim 7 wherein said second ejector inlet is adjacent to said venturi structure in said ejector pot and communicates with said degasification area through a vacuum conduit.

9. The combination of claim 8 further comprising valve means in said inlet line controlling the flow of gases to said second ejector inlet in response to a condition in said system.

10. The combination of claim 9 wherein said valve means responds to the level of degasified mud in said mud receiving area.

11. The combination of claim 10 further comprising
a contaminated mud tank for receiving gas-entrained mud from the well, said contaminated mud tank being located in the same horizontal plane as said degasified mud receiving tank and being operatively connected with said means for depositing gas-laden mud on said baffles, and a balance conduit connecting together the lower portions of said degasified mud receiving tank and said contaminated mud tank.

12. The combination of claim 11 wherein said vacuum tank is located at an elevation higher than said degasified mud receiving tank and said contaminated mud tank.

13. The combination of claim 12 further comprising means for controlling the flow of gas-laden mud upstream of said depositing means in response to the density thereof.

14. The combination of claim 2 wherein said means for controlling the flow of gas-laden mud comprises a vertically oriented valve body having an inlet in the lower portion and an outlet in the upper portion, and a vertical flow stream therethrough, a valve ball of particularly established density positioned in said flow stream adjacent said inlet and supported for movement axially in said flow stream, whereby said valve ball will initially seek a position in said flow stream allowing the desired flow through said inlet and will move downward in said flow stream toward said inlet if the density of said gas-laden mud decreases and upward if the density of said gas-laden mud increases.

15. The combination of claim 14 including means for varying the density of said valve ball.

16. The combination of claim 15 wherein said means for varying the density of said valve ball comprises
a chamber in said valve ball having an amount of liquid therein, means for varying the amount of liquid in said valve ball chamber.

17. A method of degassing drilling mud comprising the steps of
dividing said mud into thin layers in a degasification area of a tank, collecting said mud after its division into thin layers in a mud receiving area, creating a pressure differential with the low pressure end at said mud so that gas entrapped in said mud can be drawn away while the mud is divided into thin layers, allowing the mud deposited in the receiving area to settle to permit entrapped gas bubbles to rise to the surface and be withdrawn by said pressure differential, simultaneously withdrawing through a common conduit mud from said receiving area and gas from a degasification area.

18. The method of claim 17 further including the step of
venting said common conduit to the atmosphere, whereby said gas withdrawn from the degasification area of the tank will escape.

19. A method for the degasification of drilling mud comprising the steps of
dividing said mud into thin layers in a degasification area of a tank, collecting said mud in a mud receiving area in said tank, creating a pressure differential with the low pressure end at said mud so that gas entrapped in said mud can be drawn away, simultaneously withdrawing through a common conduit mud from said receiving area and gas from said receiving degasification area using previously degassed mud as the motivating force for said withdrawing.

20. The method of claim 19 further including the step of
venting said common conduit to the atmosphere, whereby said gas withdrawn from the degasification area will escape.

References Cited

UNITED STATES PATENTS

| | | | |
|---|---|---|---|
| 3,325,974 | 6/1967 | Griffin III et al. | 55—193 X |
| 3,344,584 | 10/1967 | Kehoe et al. | 55—55 X |
| 3,481,113 | 12/1969 | Burnham, Sr. | 55—41 |
| 3,517,487 | 6/1970 | Burnham, Sr. | 55—192 |

REUBEN FRIEDMAN, Primary Examiner

R. W. BURKS, Assistant Examiner

U.S. Cl. X.R.

55—55, 193; 137—533.11